Oct. 21, 1952 — R. F. FLEKLIN — 2,614,366
APPARATUS FOR CULTIVATING PLANTS
UNDER SHELTER IN THE FIELDS
Filed Dec. 13, 1946
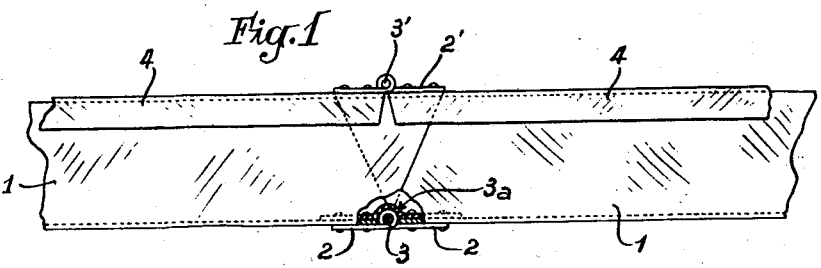
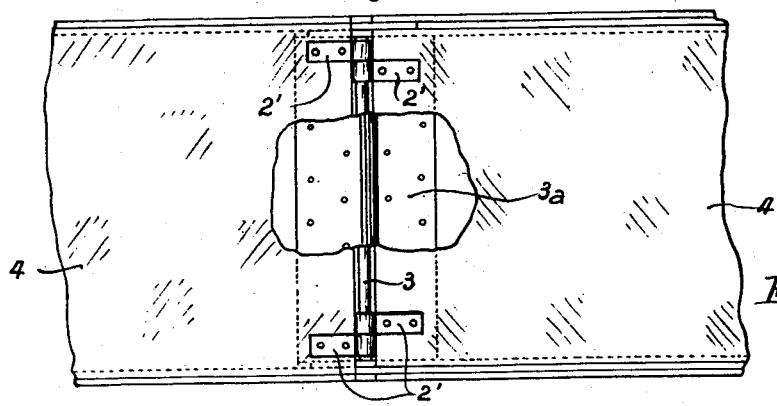
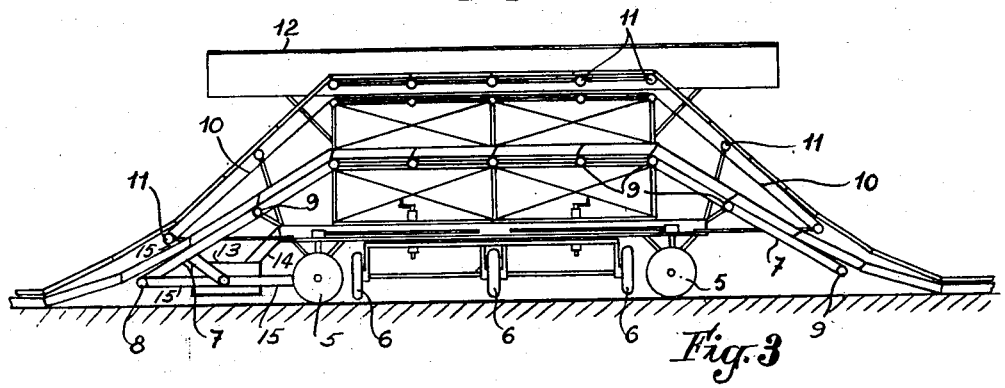
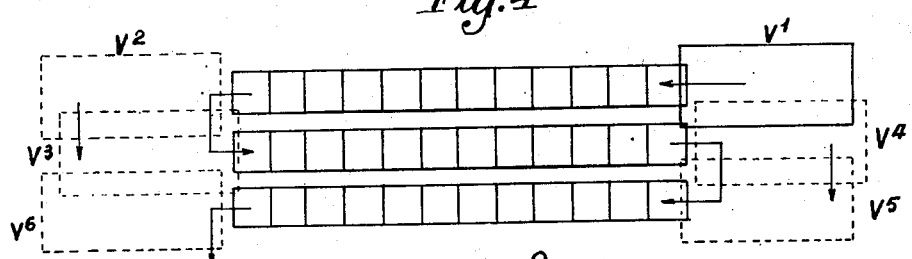

Patented Oct. 21, 1952

2,614,366

UNITED STATES PATENT OFFICE 2,614,366

APPARATUS FOR CULTIVATING PLANTS UNDER SHELTER IN THE FIELDS

Roger Félix Fléklin, Nice, France

Application December 13, 1946, Serial No. 716,145
In France June 27, 1946

11 Claims. (Cl. 47—1)

It is known that farming or gardening often requires repeated operations on a given soil or plant. These operations are generally performed at ground level, whereby they are very tiring for the operators. The efficiency is low and the cost high. The work is practically impossible under bad weather conditions.

My invention has for its object to avoid these inconveniences and to permit of performing farming or gardening operations at a suitable level above ground.

A further object of my invention is to provide means whereby such operations may be performed under shelter.

Still a further object of my invention is a method according to which the plants are cultivated in troughs, the said troughs being raised at a suitable level for the different operations under a movable shelter.

My invention also has for its object a cultivating arrangement comprising troughs articulated with each other in succession to form a chain, and a vehicle adapted to be moved along such a chain, the said vehicle being provided with means to raise the chain at its fore part, and to lower the same at its rear part, the said vehicle also preferably comprising shelter means permitting the operators to take care of the troughs even under the worst weather conditions.

In the annexed drawings:

Fig. 1 is a partial side view with parts in section illustrating two troughs articulated with each other and provided with their covers.

Fig. 2 is the corresponding partial plan view also with parts in section.

Fig. 3 is a diagrammatical side view of the vehicle with its endless conveyors, the roof being shown in section.

Fig. 4 is a diagrammatical plan view showing three rows of troughs and illustrating the different movements of the cooperating vehicle.

In the illustrated embodiment there are used troughs 1 made of metal, plastic material, or any other suitable substance, such troughs having a reduced height and being of suitable dimensions to be easily manufactured and handled. They are devoid of any transverse side in such a manner that when they are disposed in close succession and filled with earth, they form a continuous earth band which may be submitted to cultivating operations by hand or by means of the usual agricultural implements.

Troughs 1 are provided with hinges 2 disposed along the transverse edges of their bottom and these hinges receive transverse connecting spindles 3. The articulated joint thus obtained is protected by a transverse rubber strip 3a (Fig. 1) or the like (supposedly removed in Fig. 2). The longitudinal sides of the successive troughs overlap each other each side of the joint in such a manner that two successive troughs may pivot with respect to each other about their articulation through a limited angle in both directions without leaving a free lateral space between them.

Troughs 1 are also provided with covers 4 comprising transparent material such as glass, cellulose derivatives, synthetic resins, etc., and these covers are also articulated with each other in succession to form a continuous chain, the articulation comprising hinges 2' and spindles 3'.

The troughs thus constructed are disposed on the ground in parallel rows, as indicated in Fig. 4, and they are filled with earth, this latter operation being performed either with the troughs resting on the ground, or by means of the particular vehicle which will be hereafter described.

The said vehicle comprises a frame provided with wheels 5 by means of which it may be moved longitudinally, and wheels 6 by means of which it may be moved transversely. Of course means are provided to raise one set of wheels while the other set is in action, or one set, such as 5, may be fixed to the vehicle frame, while the other set 6 may be lowered for instance by means of vertical hand actuated screws, as indicated, to raise the vehicle frame and cause the first set 5 to become inoperative. According to the nature of the ground, the wheels may be replaced by caterpillars.

There is mounted on the vehicle frame an endless conveyor, formed of a band 7 travelling over rollers, one of which 8 is adapted to drive the band, while the others 9 act merely as supporting means for the band. There might also be used a plurality of parallel bands. Band 7 may be provided with projections avoiding slip, or with appropriate abutments. Band 7 is adapted to raise the successive troughs 1 of a row of troughs in front of the vehicle (arranged to move longitudinally along the row) and then to lower the same at the rear. As clearly apparent in Fig. 3, the troughs are progressively raised from the ground by the first oblique portion of the band at the front of the vehicle. They afterwards travel within the vehicle at an appropriate height for the operators, and they are gently lowered at the rear until they again rest on the ground.

Of course, the speed of the endless band 7 should be exactly equal to the speed of the vahicle in order to avoid any longitudinal effort on the chain of troughs.

The width of the troughs is selected to permit easy access to the whole surface thereof either from one side only, or from both sides, as the case may be.

There is also provided another endless band conveyor 10 travelling over rollers 11, which is adapted to raise the covers 4 at a suitable height above the troughs to permit access to the latter in front of the vehicle and thereafter to lower the said covers again on the troughs. Band 10 is also run at the same speed as the vehicle. It may pass either just under the roof 12 of the vehicle, as indicated, or above the same.

The vehicle is preferably provided with an appropriate motor 13, such as an internal-combustion engine or an electric motor adapted to drive the wheels and the bands. The motor 13 may be supported by a bracket 14 secured to the wheel base. Belts 15, driven by the motor, connect to the wheels and driven rollers, respectively. It may be provided with seats for the operators. It may comprise lighting and heating means, etc.

The operation is preferably effected as follows:

The vehicle is disposed at the end of a row of troughs, as indicated at $V_1$ in Fig. 4. It is then moved along the row, the successive troughs being raised by band 7, then caused to travel through the vehicle, and thereafter lowered again onto the ground, while the corresponding covers are raised to a higher level by band 10. The speed is sufficiently low to leave to the operators within the vehicle the time necessary to perform the cultivating operations such as sowing, treating, transplating, etc. Or, alternately, the vehicle may be stopped while the operators are working on a number of troughs, and thereafter moved to bring the next troughs into operative position.

When the vehicle has reached the end of the first row, as indicated at $V_2$, it is moved transversely (by means of wheels 6) to come in line with the second row (position $V_3$). It is then moved longitudinally along the latter, the successive troughs being raised and lowered, as for the first row, but in the opposed direction. The vehicle thus reaches the position $V_4$ from which it is moved transversely to position $V_5$. It then travels along the third row towards position $V_6$, and so on.

It will be observed that a given trough is not lowered onto the ground at the rear of the vehicle exactly at the place from which it had been raised at the front. The whole row of troughs is somewhat displaced in the direction of travel of the vehicle. The covers also are displaced in the same direction, but since they are raised to a higher level than the troughs, they are more displaced than the latter. This is easily taken into account as follows:

(i) In each row there is provided one or several supplemental covers at each end of the row, whereby, notwithstanding the relative displacement of the covers with respect to the troughs, the end troughs may be fully covered.

(ii) The direction of travel of the vehicle is alternated for the successive operations. For instance, it has been described that the vehicle moved from $V_1$ to $V_6$. For the next operation, the vehicle will move from $V_6$ to $V_1$; it will thus travel along each row in the reverse direction and the troughs and covers will be restored to their former positions.

My improved method permits of effecting any operation under the best working conditions, i. e. at the appropriate level and under shelter, irrespective of bad weather, temperature, darkness. The efficiency of manual operations is thereby considerably improved.

I claim:

1. A cultivating arrangement comprising in combination a plurality of troughs articulated with each other in succession to form a chain, the said troughs being adapted to be filled with earth and to rest on the ground; a plurality of covers for said troughs, said covers being also articulated with each other in succession to form another chain; a vehicle adapted to move along the said troughs; means on said vehicle to raise the successive troughs at the front of said vehicle as the same advances; means on said vehicle to raise the successive covers at the front of said vehicle as the same advances and at a higher level than said troughs; means on said vehicle to cause the raised troughs to travel horizontally through the said vehicle at a relative speed substantially equal to the speed of the vehicle with respect to the ground and in opposite direction; means on said vehicle to cause the raised covers to travel horizontally through the said vehicle at a relative speed substantially equal to the speed of the vehicle with respect to the ground and in opposite direction; means to lower the successive troughs onto the ground at the rear of the vehicle as the same advances; and means to lower the successive covers onto the successive troughs at the rear of the vehicle as the same advances.

2. An arrangement for cultivating under shelter in the fields comprising in combination a plurality of troughs adapted to be put in the ground in alignment with one another, a wheeled closed treating chamber adapted to move over the location of said troughs in the ground, means carried by said chamber for raising in succession the troughs into the chamber as the same advances, means carried by said chamber urging the raised troughs to travel substantially horizontally through the said chamber and means for lowering the troughs back onto the ground at the rear of the chamber as the latter advances.

3. An arrangement for cultivating under shelter in the fields comprising in combination a plurality of troughs adapted to be put in the ground in alignment with one another, covers for the different troughs, a wheeled treating chamber adapted to move over the location of said troughs, in the ground, means carried by said chamber for raising in succession the troughs into the chamber as the same advances, means carried by said chamber urging the raised troughs to travel substantially horizontally through the said chamber and means for lowering the troughs back onto the ground at the rear of the chamber as the latter advances, and further means carried by the chamber for raising the covers above the successive troughs as they are about to enter the chamber and for returning same onto corresponding troughs as they pass out of said chamber.

4. An arrangement for cultivating under shelter in the fields comprising in combination a plurality of hingedly interconnected troughs adapted to be put in the ground in alignment with one another, a wheeled treating chamber adapted to move over the location of said troughs in the ground, means carried by said chamber for raising in succession the troughs into the chamber as the same advances, means carried by said chamber urging the raised troughs to travel substantially horizontally through the said chamber and means for lowering the troughs back onto the ground at the rear of the chamber as the latter advances.

5. An arrangement for cultivating under shelter in the fields comprising in combination a plurality of hingedly interconnected troughs adapted to be put in the ground in alignment with one another, hingedly interconnected covers for the different troughs, a wheeled treating chamber adapted to move over the location of said troughs in the ground, means carried by said chamber for raising in succession the troughs into the chamber as the same advances, means carried by said chamber urging the raised troughs to travel substantially horizontally through the said chamber and means for lowering the troughs back onto the ground at the rear of the chamber as the latter advances, and further means carried by the chamber for raising the covers above the successive troughs as they are about to enter the chamber and for returning same onto corresponding troughs as they pass out of said chamber.

6. An arrangement for cultivating under shelter in the fields comprising in combination a plurality of hingedly interconnected troughs communicating directly with one another through their cooperating ends, adapted to be put in the ground in alignment with one another, hingedly interconnected covers for the different troughs, a wheeled treating chamber adapted to move over the location of said troughs in the ground, means carried by said chamber for raising in succession the troughs into the chamber as the same advances, means carried by said chamber urging the raised troughs to travel substantially horizontally through the said chamber and means for lowering the troughs back onto the ground at the rear of the chamber as the latter advances, and further means carried by the chamber for raising the covers above the successive troughs as they are about to enter the chamber and for returning same onto corresponding troughs as they pass out of said chamber.

7. An arrangement for cultivating under shelter in the fields comprising in combination a plurality of hingedly interconnected troughs communicating directly with one another through their cooperating ends with their operating bottoms in overlapping relationship adapted to be put in the ground in alignment with one another, hingedly interconnected covers for the different troughs, a wheeled treating chamber adapted to move over the location of said troughs in the ground, means carried by said chamber for raising in succession the troughs into the chamber as the same advances, means carried by said chamber urging the raised troughs to travel substantially horizontally through the said chamber and means for lowering the troughs back onto the ground at the rear of the chamber as the latter advances, and further means carried by the chamber for raising the covers above the successive troughs as they are about to enter the chamber and for returning same onto corresponding troughs as they pass out of said chamber.

8. An arrangement for cultivating under shelter in the fields comprising in combination a plurality of hingedly interconnected troughs communicating directly with one another through their cooperating ends adapted to be put in the ground in alignment with one another, flaps of flexible material covering the joint between the cooperating bottoms of any two successive troughs, hingedly interconnected covers for the different troughs, a wheeled treating chamber adapted to move over the location of said troughs in the ground, means carried by said chamber for raising in succession the troughs into the chamber as the same advances, means carried by said chamber urging the raised troughs to travel substantially horizontally through the said chamber and means for lowering the troughs back onto the ground at the rear of the chamber as the latter advances, and further means carried by the chamber for raising the covers above the successive troughs as they are about to enter the chamber and for returning same on to corresponding troughs as they pass out of said chamber.

9. An arrangement for cultivating under shelter in the fields comprising in combination a plurality of troughs adapted to be put in the ground in alignment with one another, a closed treating chamber adapted to move over the location of said troughs in the ground, means carried by said chamber for raising in succession the troughs into the chamber as the same advances, means carried by said chamber urging the raised troughs to travel substantially horizontally trough the said chamber and means for lowering the troughs back onto the ground at the rear of the chamber as the latter advances, a double series of wheels for the treating chamber set in two different directions and means for selectively controlling same for movements in the corresponding directions.

10. A cultivating arrangement comprising in combination a plurality of similar troughs of equal height, pivotally secured to each other in succession to form a chain, said troughs being adapted to be filled with earth and to normally rest on the ground, a rigid wheeled vehicle adapted to move underneath said troughs and including means for raising the successive troughs at the front of said vehicle as the same advances, further means on said vehicle to cause the raised troughs to travel substantially horizontally over the vehicle at a relative speed substantially equal to the speed of the vehicle with respect to the ground and in the opposite direction and further means to lower the successive troughs onto the ground at the rear of said vehicle as the same advances.

11. A cultivating arrangement comprising in combination a plurality of similar troughs of equal height, pivotally secured to each other in succession to form a chain, said troughs being adapted to be filled with earth and to normally rest on the ground, a rigid wheeled vehicle adapted to move underneath said troughs and including an endless conveyor carried by said vehicle and including a first part disposed obliquely at the front of the vehicle and adapted to run backwards and upwards to raise the successive troughs at the front of the vehicle as the same advances, a second part disposed horizontally over the central part of the vehicle and adapted to run backwards to cause the raised troughs to travel substantially horizontally with said second part at a relative speed that is substantially equal and opposed to the speed of the vehicle with respect to ground and a third part arranged obliquely at the rear of the vehicle and adapted to run backwards and downwards to lower the successive troughs onto the ground at the rear of the vehicle, as the same advances.

ROGER FÉLIX FLÉKLIN.

REFERENCES CITED

The following references are of record in the file of this patent:

UNITED STATES PATENTS

| Number | Name | Date |
|---|---|---|
| 536,360 | Simmons | Mar. 26, 1895 |
| 1,121,722 | Fessenden | Dec. 22, 1914 |
| 1,753,980 | Baumgartner | Apr. 8, 1930 |
| 1,793,626 | McCormick | Feb. 24, 1931 |
| 1,831,176 | Holm-Hansen | Nov. 10, 1931 |
| 2,030,268 | Radley | Feb. 11, 1936 |
| 2,244,677 | Cornell | June 10, 1941 |

FOREIGN PATENTS

| Number | Country | Date |
|---|---|---|
| 104,778 | Austria | Nov. 25, 1926 |
| 637,608 | France | Feb. 6, 1928 |
| 51,469 | Norway | Sept. 19, 1932 |